US008576235B1

(12) United States Patent
Sumner et al.

(10) Patent No.: US 8,576,235 B1
(45) Date of Patent: Nov. 5, 2013

(54) VISIBILITY TRANSITION PLANNING FOR DYNAMIC CAMERA CONTROL

(75) Inventors: Robert Sumner, Zurich (CH); Markus Gross, Uster (CH); Nils Thuerey, Zurich (CH); Thomas Oskam, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 617 days.

(21) Appl. No.: 12/834,840

(22) Filed: Jul. 12, 2010

Related U.S. Application Data

(60) Provisional application No. 61/225,193, filed on Jul. 13, 2009.

(51) Int. Cl.
*G06T 13/00* (2011.01)
(52) U.S. Cl.
USPC .......................................... 345/474; 345/473
(58) Field of Classification Search
USPC .................................................. 345/473–475
See application file for complete search history.

(56) References Cited

U.S. PATENT DOCUMENTS 8,089,479 B2 * 1/2012 Deb et al. ....................... 345/419

OTHER PUBLICATIONS

Zhang et al., Octree-based Camera Planning in Virtual Environments, Proceedings of the Ninth International Conference on Computer Supported Cooperative Work in Design, May 2005, pp. 767-771.*
Salomon et al., Interactive Navigation in Complex Environments Using Path Planning, Proceedings of the 2003 Symposium on Interactive 3D Graphics, 2003, pp. 41-50.*
Li et al., Real-Time Camera Planning for Navigation in Virtual Environments, Smart Graphics 2008, Lectures Notes in Computer Science 5166, Aug. 2008, pp. 118-129.*
Hamazaki et al., Extracting Camera-Control Requirements and Camera Movement Generation in a 3D Virtual Environment, Proceedings of the 2008 International Conference on Advances in Computer Entertainment Technology, 2008, pp. 126-129.*
Christie et al., Camera Control in Computer Graphics, Computer Graphics Forum, vol. 27, No. 8, 2008, pp. 2197-2218.*
Bandyopadhyay T., et al., "Stealth tracking of an unpredictable target among obstacles," Algorithmic Foundations of Robotics VI, Erdmann M. et al., (Eds.). Springer-Verlag, 2004, pp. 43-58.
Bandyopadhyay T., et al., "A greedy strategy for tracking a locally predictable target among obstacles," Proc. IEEE Int. Conf. on Robotics & Automation, 2006, pp. 2342-2347.

(Continued)

*Primary Examiner* — Xiao M. Wu
*Assistant Examiner* — Charles Tseng
(74) *Attorney, Agent, or Firm* — Kilpatrick Townsend & Stockton LLP

(57) ABSTRACT

A camera control system is provided that uses global planning to compute large, occlusion free camera paths through complex environments, incorporating visibility of a focus point into the search strategy, so that a path is chosen along which the focus target is in view or, in general, to compute a visibility graph. A visibility roadmap data structure permits precomputation of coarse representations of collision-free paths through an environment, together with estimates of pair-wise visibility between scene portions. At runtime, path planning can be done using the precomputed roadmap values to find a coarse path, and then refined to the camera path using occlusion maps computed on-the-fly. Iterative smoothing, together with a physically-based camera model, can be used to have the path followed by the camera smooth in both space and time. The data structure can be adapted at runtime to deal with dynamic occluders that move in an environment.

39 Claims, 9 Drawing Sheets

(56) References Cited

OTHER PUBLICATIONS

Bandyopadhyay T., et al., "Motion Planning for 3-d target tracking among obstacles," Proc. Int. Symp. on Robotics Research, 2007.

Bittner J., "Hierarchical Techniques for Visibility Computations," PhD thesis, Czech Technical University, Oct. 2002.

Bradshaw G., et al., "Adaptive medial-axis approximation for sphere-tree construction," ACM Transactions on Graphics 23, 2004, pp. 1-26.

Brogan D. C., et al., "Dynamically simulated characters in virtual environments," IEEE Computer Graphics and Applications, 1998, vol. 15, No. 5, pp. 58-69.

Byrne P., et al., "A principle for learning egocentric-allocentric transformation," Neural Computation, 2008, vol. 20, No. 3, pp. 709-737.

Cohen-Or D., et al., "A survey of visibility for walkthrough applications." IEEE Transactions on Visualization and Computer Graphics, Jul. 2003, vol. 9, pp. 412-431.

Dechter R., et al., "Generalized best-first search strategies and the optimality of a," J. ACM 32(3), 1985, pp. 505-536.

Durand, F., "A multidisciplinary survey of visibility," 2000, Siggraph '2000 course notes on Visibility, title page and table of contents, 4 pages.

Farin, G., "Curves and surfaces for CAGD: a practical guide," Morgan Kaufmann Publishers Inc., San Francisco, CA, USA, 2002.

Halper, N., et al., "A camera engine for computer games: Managing the tradeoff between constraint satisfaction and frame coherence," Comput. Graph. Forum, vol. 20, No. 3, 2001.

He, L., et al., "The virtual cinematographer: a paradigm for automatic real-time camera control and directing," SIGGRAPH '96: Proceedings of the 23rd annual conference on Computer graphics and interactive techniques, 1996.

Laine, S., "A general algorithm for output sensitive visibility preprocessing," I3D '05: Proceedings of the 2005 symposium on Interactive 3D graphics and games, 2005, pp. 31-40.

Lavalle S. M.: Planning Algorithms. Cambridge University Press, 2006.

Lazebnik, S., "Visibility-Based Pursuit Evasion in Three-Dimensional Environments," Tech. Rep. CVR TR 2001-01, Beckman Institute, University of Illinois, 2001.

Masehian, E., et al., "Classic and heuristic approaches in robot motion planning—a chronological review," Proceedings of World Academy of Science, Engineering and Technology, 2007, vol. 23.

Murrieta-Cid R., et al., "Maintaining visibility of a moving target at a fixed distance: The case of observer bounded speed," Proceedings IEEE International Conference on Robotics and Automation, 2004, pp. 479-484.

Murrieta-Cid, R., et al., "Surveillance strategies for a pursuer with finite sensor range," Int. J. Rob. Res. vol. 26, No. 3, 2007, pp. 233-253.

Niederberger, C., et al., "Generic path planning for real-time applications," Proceedings of Computer Graphics International, pp. 2004, pp. 299-306.

Siméon, T., et al., "Visibility-based probabilistic roadmaps for motion planning," Advanced Robotics, vol. 14, No. 6, 2000.

Varadhan, G., et al., "Star-shaped roadmaps—a deterministic sampling approach for complete motion planning," Robotics: Science and Systems, 2005, The MIT Press, pp. 25-32.

Vidal, R., et al., "Probabilistic pursuit-evasion games: theory, implementation, and experimental evaluation," Robotics and Automation, IEEE Transactions, 2002, pp. 662-669.

Yang, L., et al., "An Improved Random Neighborhood Graph Approach," Proceedings IEEE International Conference on Robotics and Automation, 2002, pp. 254-259.

Yang, Y., et al., "Globally task-consistent motion for autonomous mobile manipulation in dynamic environments," Proceedings of Robotics: Science and Systems (Philadelphia, USA, Aug. 2006).

Bares, W. H., et al., "Realtime Constraint-Based Cinematography for Complex Interactive 3D Worlds," AAAI '98/IAAI '98 Proceedings of Artificial intelligence/Innovative applications of artificial intelligence, 1998, 6 pages.

Drucker, S. M., et al., "Intelligent camera control in a virtual environment," Proceedings of Graphics Interface '94 (Banff, Alberta, Canada, 1994), 10 pages.

Pharr, M., et al., "Physically Based Rendering: From Theory to Implementation," Morgan Kaufmann Publishers Inc., San Francisco, CA, USA, 2004.

\* cited by examiner

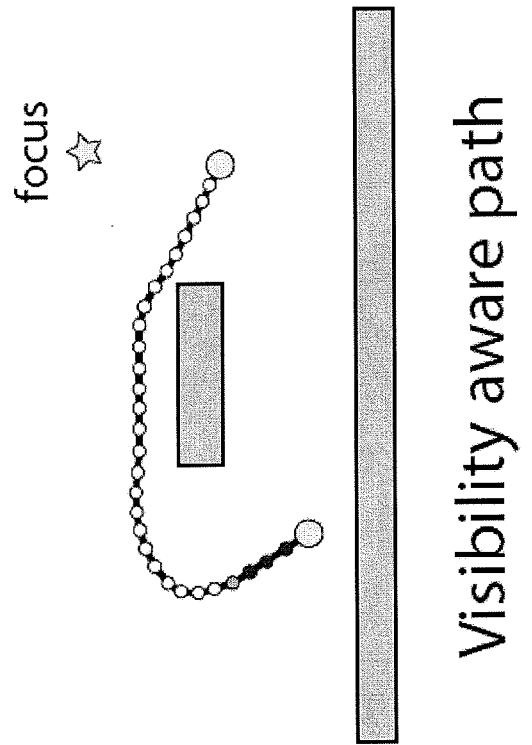
Fig. 1(b) Visibility aware path
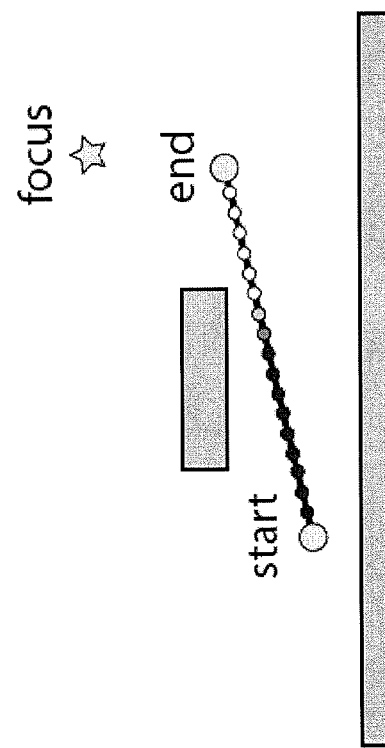
Fig. 1(a) Shortest path

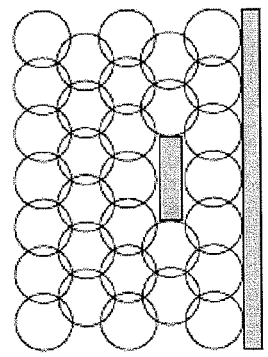
1) Free space sampled with spheres.
Fig. 3(a)

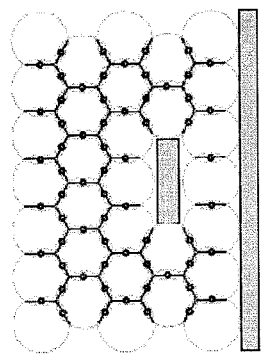
2) Compute portal regions for overlapping spheres.
Fig. 3(b)

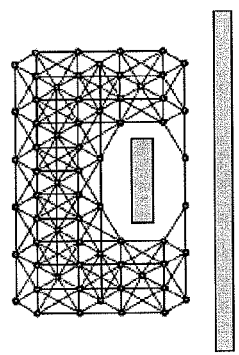
3) Construct roadmap from portals.
Fig. 3(c)

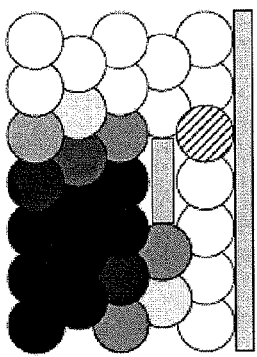
4) Compute visibility for each pair of spheres with Monte-Carlo raytracing.
Fig. 3(d)

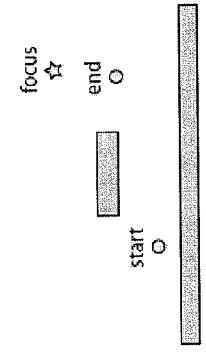
Compute visibility aware path based on the roadmap.
Fig. 4(a)

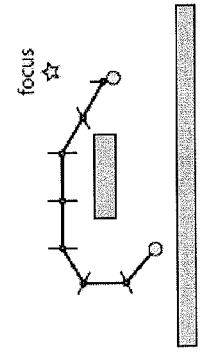
Construct initial path along overlap regions.
Fig. 4(b)

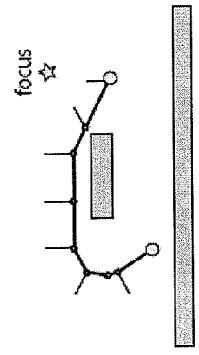
Post-processed path within the overlap regions.
Fig. 4(c)

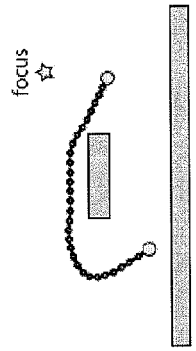
Traverse path with camera, recompute if the focus is moving.
Fig. 4(d)

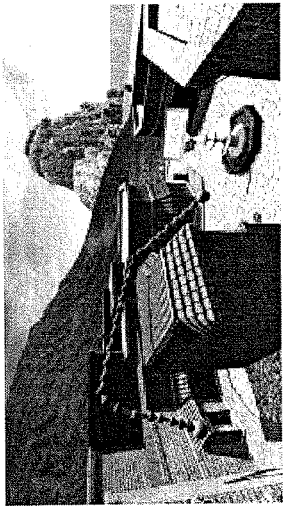
Fig. 11(a)
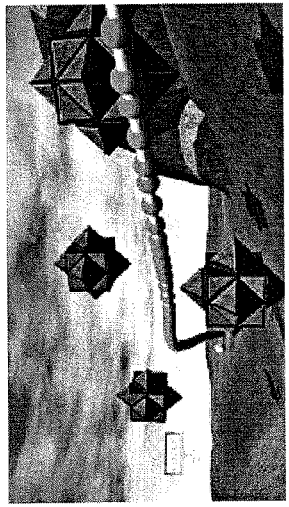
Fig. 11(b)
Fig. 11(c)
| Environment | Urban | Woodland | Arena | Tea house | Valley | Port Royale |
|---|---|---|---|---|---|---|
| Polygons | 90 | 1778 | 15536 | 8918 | 8388 | 34721 |
| Grid resolution | 30x44x41 | 75x25x67 | 75x14x68 | 40x6x40 | 75x21x76 | 65x21x83 |
| Spheres | 1035 | 2152 | 2008 | 819 | 1106 | 3102 |
| Roadmap nodes | 5911 | 8730 | 3991 | 3999 | 7953 | 24989 |
| Visibility distance | 100% | 100% | 30% | 100% | 100% | 25% |
| Precomputation [sec.] | 8.1 | 61.4 | 27 | 35 | 51 | 28 |
| Memory roadmap [MB] | 3.61 | 4.29 | 2.92 | 2.07 | 5.10 | 6.36 |
| Method | Transitions | Switching | Local | Dynamic | Dynamic | Transitions |
| Avg. Path Length [# nodes] | 9.1 | 4.8 | 3.5 | 12.0 | 9.6 | 14.7 |
| Avg. Search [ms] | 4.46 | 7.44 | 1.80 | 27.67 | 25.1 | 14.48 |
| Avg. Post-processing [ms] | 1.20 | 2.41 | 0.41 | 2.34 | 6.61 | 0.63 |
Fig. 12

VISIBILITY TRANSITION PLANNING FOR DYNAMIC CAMERA CONTROL

CROSS-REFERENCES TO RELATED APPLICATIONS

This application claims benefit under 35 USC §119(e) of U.S. Provisional Patent Application No. 61/225,193, filed Jul. 13, 2009, which is herein incorporated by reference in its entirety for all purposes.

BACKGROUND

The present invention relates to image generation, in general, and in particular to image generation from moving camera positions within a geometric model space.

An animated video presentation or display for an interactive game or tool can be provided by a computer, computer system or device capable of computing ("a computing device" as used herein) that has memory for storing parameters of a geometric model space and descriptions of a set of virtual objects (shapes, textures, alpha, location in the model space, etc.) where the computing device considers the space, the objects as well as a camera view point, view direction and view range (e.g., a viewing rectangle or other 2D shape) and from that data, generates a view that shows the virtual objects in their place. It is well known how to render images, or sequences of images such as a video sequence, given that data. There is considerable literature on how to describe the virtual objects such that the rendered views present realistic and/or interesting imagery. For moving image sequences, the camera placement and view are also important.

In an animated feature, it might be desired to maintain visibility of one or more objects and/or points or locations in the model space. For example, where the image sequence is to be presented as a story, it might be desired to keep the main character of the current scene in view as the camera moves to follow that character's movements, or to change the angle of the camera. For video games, where some actions are controlled by a player of the video game and that player controls a virtual character, it might be desired to keep that character in view as the camera view point shifts to take into account player movements of the virtual character. In many video games, and where the player can control character movements freely and in real-time, expecting a real-time response from a display, camera movements need to be determined in real-time.

Positioning of a camera in a virtual space is a virtual operation itself. In other words, an actual camera is not placed anywhere, but the computing device computes the image that would result if the virtual objects were real, were placed in space in accordance with the locations indicated by the data representing those virtual objects, and an image captured by a camera located in the corresponding camera location.

Camera control processes for computer graphics are known. A number of examples are shown in [Christie]. Many classical third-person camera models examine the local vicinity in order to resolve occlusions. A common camera model used in computer games casts a ray from the player's character to the current camera view point and "teleports" the camera to the closest intersection, leading to a noticeable jump in view. An alternate scheme makes occluding geometry transparent, which avoids camera jumps but detracts from the environment's realism.

[Halper] presents a more sophisticated local camera model that resolves occlusions using point-based visibility. While that may handle some situations well, its local nature leads to inherent limitations. The camera may not adequately follow a fast moving character or resolve a complicated visibility situation, resulting in discontinuous jumps or passing through scene geometry. It is often preferable to have a global process that handles large-scale camera transitions and can "follow" an avatar, character or other object in a natural fashion without discontinuous jumps or collisions with objects in the scene.

Some high-level approaches to camera control focus on virtual cinematography, in which cinematographic knowledge is incorporated into the choice of camera position and scene composition. For example, [Bares] describes a constraint-based camera planner for shot composition that models different cinematic styles, and [He] describes encoding film-making heuristics into a hierarchical finite state machine that controls camera selection and placement. Cinematographic rules may provide a sequence of shot placements and focus targets, but often do not directly handle the actual camera motion between such shots. [Drucker] presents an alternative for advanced camera control with visibility-based path optimization.

As shown by surveys on the topic ([Cohen-Or], [Bittner], [Durand]), many visibility algorithms strive to identify which objects, lights, or other portions of a scene are visible from a given vantage. Runtime visibility calculations can be accelerated via precomputation, in which a visibility relationship between "viewcells" in space and scene objects is established. The problem of visibility transition planning, such as defining a path, is closely related to the topic of motion planning in the robotics literature where optimal paths are found for robot navigation, as mentioned by [LaValle] and [Masehian]. Many motion planning algorithms employ a roadmap construction in which the free and uncolliding configuration space of a robot is mapped to a graph data structure, reducing the planning problem to a graph search. [LaValle] describes this approach.

Some processes for motion planning incorporate a notion of visibility into the graph reduction in the form of a sparse set of guard nodes whose visibility region can be defined by unobstructed straight lines in configuration space, as described in [Varadhan], or by the ability of a local planner to navigate without intersection, as described in [Simeon]. The related problem of target tracking strives to compute the motion of a robot observer in order to maintain visibility of a moving target. Sophisticated algorithms address this problem in planar environments with polygonal obstacles and are described by [Murrieta-Cid2004], [Bandyopadhyay2004], [Bandyopadhyay2006]. However, direct extension of this work to full 3D motion is non-trivial, partly because visibility relationships are significantly more complex, as explained by the 3D target tracking approach of [Bandyopadhyay2007], which presents an online algorithm designed for an unknown environment where input comes from a robot's visual sensors. In virtual environments, the entire scene is usually known a priori and the camera should make use of this information to find more natural transitions. Other work on 3D tracking does not deal with occlusions ([Vidal]) or presents interesting theoretical results without demonstrating a system that matches the strict efficiency demands of animation and/or games ([Murrieta-Cid2007], [Lazebnik]).

[Salomon] describes an approach wherein a roadmap is created in which nodes represent an avatar's position and edges connect nodes between which a local planner can successfully navigate. [Niederberger] presents a navigation system using a shortest-path search on a triangulated height-field terrain. Often, these approaches do not meet the needs of particular systems, such as where cameras might not be tied to walkable surfaces, but available in the full ambient space, or where dense visibility needs to be considered.

For these and other reasons, improved camera path planning is needed for some applications.

REFERENCES

[Bandyopadhyay2004] BANDYOPADHYAY T., LI Y., ANG JR. M., HSU D.: Stealth tracking of an unpredictable target among obstacles. In Algorithmic Foundations of Robotics VI, Erdmann M. et al., (Eds.). Springer-Verlag, 2004, pp. 43-58.

[Bandyopadhyay2006] BANDYOPADHYAY T., LI Y., ANG JR. M., HSU D.: A greedy strategy for tracking a locally predictable target among obstacles. In Proc. IEEE Int. Conf. on Robotics & Automation (2006), pp. 2342-2347.

[Bandyopadhyay2007] BANDYOPADHYAY T., ANG JR. M., HSU D., Motion Planning for 3-d target tracking among obstacles. In Proc. Int. Symp. on Robotics Research (2007).

[Bares] BARES W. H., GREGOIRE J. P., LESTER J. C.: Real-time constraint-based cinematography for complex interactive 3d worlds. In AAAI '98/IAAI '98: Proceedings of Artificial intelligence/Innovative applications of artificial intelligence (1998).

[Bittner] BITTNER J.: Hierarchical Techniques for Visibility Computations. PhD thesis, Czech Technical University, October 2002.

[Bradshaw] BRADSHAW G.: Adaptive medial-axis approximation for sphere-tree construction. ACM Transactions on Graphics 23 (2004), 1-26.

[Brogan] BROGAN D. C., METOYER R. A., HODGINS J. K.: Dynamically simulated characters in virtual environments. In IEEE Computer Graphics and Applications (1998), vol. 15(5), pp. 58-69.

[Byrne] BYRNE P., BECKER S.: A principle for learning egocentric-allocentric transformation. Neural Computation 20, 3 (2008), 709-737.

[Christie] CHRISTIE M., OLIVIER P., NORMAND J.-M.: Camera control in computer graphics. Computer Graphics Forum 27, 8 (2008), 2197-2218.

[Cohen-Or] COHEN-OR D., CHRYSANTHOU Y. L., SILVA C. T., DURAND F.: A survey of visibility for walkthrough applications. In IEEE Transactions on Visualization and Computer Graphics (July 2003), vol. 9, pp. 412-431.

[Dechter] DECHTER R., PEARL J.: Generalized best-first search strategies and the optimality of a*. J. ACM 32(3) (1985), 505-536.

[Drucker] DRUCKER S. M., ZELTZER D.: Intelligent camera control in a virtual environment. In Proceedings of Graphics Interface '94 (Banff, Alberta, Canada, 1994), pp. 190-199.

[Durand] DURAND F.: A multidisciplinary survey of visibility, 2000.

[Farin] FARIN G.: Curves and surfaces for CAGD: a practical guide. Morgan Kaufmann Publishers Inc., San Francisco, Calif., USA, 2002.

[Halper] HELPER N., HELBING R., STROTHOTTE T.: A camera engine for computer games: Managing the tradeoff between constraint satisfaction and frame coherence. Comput. Graph. Forum 20, 3 (2001).

[He] HE L., COHEN M. F., and SALESIN D. H.: The virtual cinematographer: a paradigm for automatic real-time camera control and directing. In SIGGRAPH '96: Proceedings of the 23rd annual conference on Computer graphics and interactive techniques (1996).

[Laine] LAINE S.: A general algorithm for output sensitive visibility preprocessing. In I3D '05: Proceedings of the 2005 symposium on Interactive 3D graphics and games (2005), pp. 31-40.

[LaValle] LAVALLE S. M.: Planning Algorithms. Cambridge University Press, 2006.

[Lazebnik] LAZEBNIK S.: Visibility-Based Pursuit Evasion in Three-Dimensional Environments. Tech. Rep. CVR TR 2001-01, Beckman Institute, University of Illinois, 2001.

[Li] LI T.-Y., CHENG C.-C.: Real-time camera planning for navigation in virtual environments. In Proceedings of Smart Graphics (2008), pp. 118-129.

[Masehian] MASEHIAN E., SEDIGHIZADEH D.: Classic and heuristic approaches in robot motion planning—a chronological review. In Proceedings of World Academy of Science, Engineering and Technology (2007), vol. 23.

[Murrieta-Cid2004] MURRIETA-CID R., SARMIENTO A., BHATTACHARYA S., and HUTCHINSON S.: Maintaining visibility of a moving target at a fixed distance: The case of observer bounded speed. In Proceedings IEEE International Conference on Robotics and Automation (2004), pp. 479-484.

[Murrieta-Cid2007] MURRIETA-CID R., MUPPIRALA T., SARMIENTO A., and BHATTACHARYA S., and HUTCHINSON S.: Surveillance strategies for a pursuer with finite sensor range. Int. J. Rob. Res. 26, 3 (2007), 233-253.

[Niederberger] NIEDERBERGER C., RADOVIC D., GROSS M.: Generic path planning for real-time applications. In Proceedings of Computer Graphics International (2004), pp. 299-306.

[Pharr] PHARR M., HUMPHREYS G.: Physically Based Rendering: From Theory to Implementation. Morgan Kaufmann Publishers Inc., San Francisco, Calif., USA, 2004.

[Salomon] SALOMON B., GARBER M., LIN M. C., MANOCHA D.: Interactive navigation in complex environments using path planning In I3D '03: Proceedings of the 2003 symposium on Interactive 3D graphics (2003), pp. 41-50.

[Simeon] SIMEON T., LAUMOND J.-P., NISSOUX C.: Visibility-based probabilistic roadmaps for motion planning Advanced Robotics 14, 6 (2000).

[Varadhan] VARADHAN G., MANOCHA D.: Star-shaped roadmaps—a deterministic sampling approach for complete motion planning In Robotics: Science and Systems (2005), The MIT Press, pp. 25-32.

[Vidal] VIDAL R., SHAKERNIA O., KIM H. J., and SHIM D. H., SASTRY S.: Probabilistic pursuit-evasion games: theory, implementation, and experimental evaluation. Robotics and Automation, IEEE Transactions on 18, 5 (2002), 662-669.

[Yang2002] YANG L., LAVALLE S.: An Improved Random Neighborhood Graph Approach. In Proceedings IEEE International Conference on Robotics and Automation, pp. 254-259 (2002).

[Yang2006] YANG Y., BROCK O.: Elastic roadmaps: Globally task-consistent motion for autonomous mobile manipulation in dynamic environments. In Proceedings of Robotics: Science and Systems (Philadelphia, USA, August 2006).

SUMMARY

A computing device according to embodiments of the present invention generates and uses a graph structure representing a geometric model space partitioned into clear (passable) subvolumes and visibility values between pairs of subvolumes. The graph structures can be used for visibility processes, such as determining a camera path. The graph structures can be calculated in advance so that when a start point of a camera path, an end point of the camera path and/or a camera focus point are determined in real-time, a camera path can be determined in real-time, thereby allowing for faster processing for a given computing power or allowing for less computing power to be used.

In a particular computer-implemented animation or gaming system that maintains a geometric model space having coordinates in order to generate one or more images representing virtual objects in that geometric model space within a time allotted for a computing system to generate the one or more images from a camera view position in the geometric model space based on a computer-readable input of a set of virtual objects positioned in the geometric model space and parameters of the geometric model space, a method of computing a camera path for the camera view position from a start point to an end point, the camera path being such that the animation or gaming system will generate a display of the objects in the geometric model space as viewed from the camera path, the system might determine a path time period over which the camera view position is to change from the start point to the end point along the camera path, determine a camera focus point in the geometric model space, wherein the camera focus point is a point or location in the geometric model space that the animation or gaming system will attempt to keep in view, wherein view is determined, at least in part, based on at least an approximation of whether opaque virtual objects are positioned along a ray spanning from the camera focus point to the camera view position as the system moves the camera view position over the camera path, and use that information. The system can divide the geometric model space into clear subvolumes, build a graph structure, representable in electronic storage, having nodes representing transition locations between adjacent clear subvolumes and edges representing transitions from one transition location in a given clear subvolume to another transition location in the given clear subvolume, compute visibility weights for pairs of clear subvolumes, independent of a camera focus point and independent of a camera view position, wherein a visibility weight corresponds to a visibility measure between the clear subvolumes of the pair, determine a preferred coarse path along the graph structure from a starting clear subvolume to an ending clear subvolume taking into account the visibility weights for pairs of clear subvolumes wherein one subvolume of the pair is a subvolume containing the camera focus point, and determined the camera path from the preferred coarse path.

The camera path can be a refinement of the preferred coarse path, or the coarse path can be used as the camera path. The camera path can be used for animation, games, presentations, simulations, or the like. The graph structure can be built and the visibility weights are calculated, ahead of time, and updated as needed when objects move. Preferably, the camera path solution does not pass the camera path through objects that are marked as not being traversable (e.g., a solid wall). Visibility can be simple visibility (e.g., is there only transparent objects or ambient space along a line segment between two points), but might also include other factors (such as assigning lower visibility to higher heights so that camera paths are kept low to a surface). The subvolumes might be spheres, a voxel grid, octrees, BSP-trees or KD-trees and might be overlapping subvolumes or nonoverlapping subvolumes.

In some embodiments, view is maximized whereas in others view is minimized. The camera path length might determine a path time, such that longer paths are traversed more quickly. Not all subvolumes need be considered and distant subvolumes might be omitted from the graph structure. Visibility might be approximated, such as by using a Monte Carlo method.

In some embodiments, movements are predicted so that the camera path can be such that the camera focus point is less likely to be obscured as it moves.

The following detailed description together with the accompanying drawings will provide a better understanding of the nature and advantages of the present invention.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIG. 1 illustrates an operation of a system for visibility transition planning to keep a focus point in view; FIG. 1 comprises FIGS. 1(a) and 1(b).

FIG. 2 comprises FIGS. 2(a), 2(b), 2(c) and 2(d).

FIG. 3 is an illustration of a specific implementation of a roadmap; FIG. 3 comprises FIGS. 3(a), 3(b), 3(c) and 3(d).

FIG. 4 illustrates steps to compute a visibility aware path based on the roadmap; FIG. 4 comprises FIGS. 4(a), 4(b), 4(c) and 4(d).

FIG. 5 comprises FIGS. 5(a) and 5(b).

FIG. 6 comprises FIGS. 6(a) and 6(b).

FIG. 9 comprises FIGS. 9(a), 9(b) and 9(c).

FIG. 10 comprises FIGS. 10(a), 10(b) and 10(c).

FIG. 11 illustrates additional examples; FIG. 11 comprises FIGS. 11(a), 11(b) and 11(c).

FIG. 12 is a table providing an example of roadmap sizes, precomputation times and run-time performance measurements for the different parts of a process according to embodiments of the present invention.

DETAILED DESCRIPTION OF EXEMPLARY EMBODIMENTS

Figures 2A, 2B, 2C, 2D:
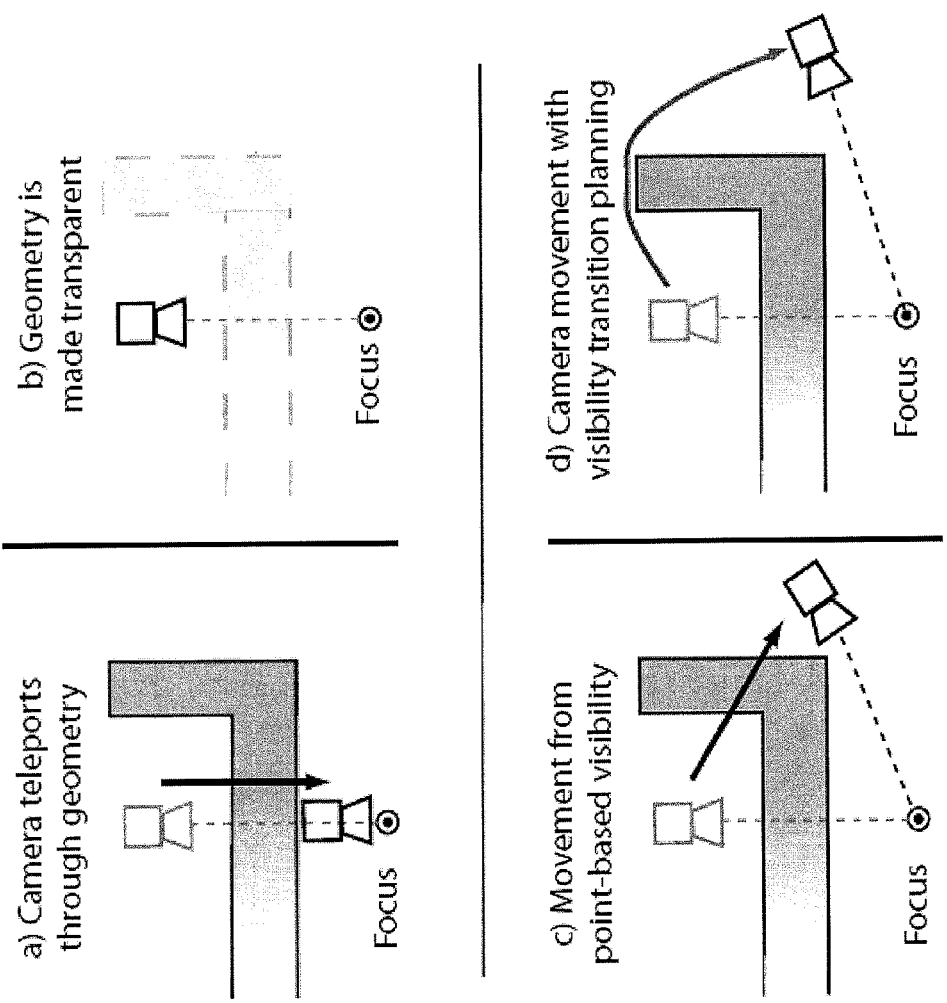
FIG. 2 is a simple example that illustrates the different behaviors of commonly used methods for camera control.

The embodiments described herein are usable to determine, as part of graphics rendering, a camera path. Ideally, camera paths are long, collision-free camera transitions through a complex virtual environment, guided by the visibility of a camera focus point. Where the start point, end point and camera focus point for a camera path are often specified only at runtime and might be located anywhere in a scene and may even change continuously, the actual camera path may need to be calculated in real-time, but some operations can be done in advance without reference to those points.

The computing device that determines the camera path can be the same computing device that operates the rendering, separate devices, or separate threads executing in software on the same device. However done, many of the embodiments described herein allow for exploration of arbitrary parts of an environment's clear (passable) space while continually querying the visibility of the camera focus point in order to compute the best (or a best camera) transition, which is an improvement over prior approaches. The clear space need not be empty space. For example, while a camera should not have a path through a subspace entirely occupied by a solid rock wall object, in most cases a path through a subspace entirely occupied by a fog object might be unobjectionable. It may be that the computing device includes other data about exceptions to the rule that the path can go through fluid or gaseous objects, but not solid immovable objects. For example, a game designer or an application designer might decide to allow paths through objects that are flagged with a traversability attribute that would allow it and block paths through objects that are disallowed for some reason. For example, transparent window glass objects could have the possibility attribute or not. Some traversability attributes might be used arbitrarily by the computing device and might not entirely comply with real-world notions of traversability. For the purposes of this description, it should be assumed that a clear space is a portion of the environment through which a camera is allowed to pass. It need not be the case that such allowances are entirely driven by which objects are where in the environment and the nature of the objects and their rigidity. In a simple case, paths are allowed if and only if there are no rigid objects in the way and therefore all of the clear space is made up of empty space and space occupied by nonrigid objects. In other cases, the clear space is more complexly defined. In any case, a clear subvolume is a subvolume that does not contain any virtual objects that are not allowed to be traversed by whatever rules are set forth for determining traversability.

FIG. 1 illustrates an operation of a system for visibility transition planning that computes long camera transitions in real-time that keep a focus point in view. FIG. 1 comprises FIGS. 1(a) and 1(b). FIG. 1(a) shows the results of a straight-line path generation. Note that given the placement of the shelf object, the camera focus point is obscured for much of the camera path. FIG. 1(b) illustrates a visibility-aware camera path, which takes into account visibility. Embodiments of the present invention that use the visibility transition planning described herein can compute long camera transitions in real-time that keep a camera focus point in view. Complex camera movements can be performed that follow a fast moving character/avatar, adapt to dynamic environments, and compute fly-throughs in large-scale game scenes (for an example, see FIG. 11(c)).

FIG. 2 illustrates several variations to camera movement, using a simple example that illustrates the different behaviors of commonly used methods for camera control. FIG. 2 comprises FIGS. 2(a), 2(b), 2(c) and 2(d).

FIG. 2(a) illustrates a ray cast method, which can result in sudden jumps. FIG. 2(b) illustrates the approach where obstructing geometry is made transparent, to provide visibility—this does not quite solve the problem where there is a constraint that the camera cannot pass through solid objects, since eventually the camera would have to move through the solid, but transparent, object. FIG. 2(c) illustrates the results using a point-based visibility criterion, as might be described by [Halper], but note that the camera may pass through geometry. FIG. 2(d) illustrates a preferred method, which correctly avoids obstacles.

Although local camera models that resolve occlusions using point-based visibility may handle some situations well, their local nature leads to inherent limitations. The camera may not adequately follow a fast moving character or resolve a complicated visibility situation, resulting in discontinuous jumps or passing through scene geometry. In contrast, embodiments that use aspects of the system described herein are global in nature, which permits both large-scale camera transitions as well as a third-person camera that follows an avatar in a natural fashion without discontinuous jumps or collisions with objects in the scene. Some objects can be configured as objects for which traversal is not prohibited. For example, while it would enhance realism to prevent a camera path from passing through a solid wall, traversing through an object representing a puff of smoke object might be allowed.

An aspect of the system described herein is a focus on visibility during large camera transitions. Runtime visibility calculations can be accelerated via precomputation, in which a visibility relationship between subvolumes can be computed in advance with a data structure that estimates the visibility of every region of space with respect to every other region of space (except those regions excluded because of nonconnectedness, distance from points of interest, or other reasons).

In virtual environments, the entire scene is usually known a priori (subject possibly to some small number of objects moving), so the computing device should make use of this information to find more natural transitions. By dividing up the ambient space (or the "clear" space not occupied by objects that are obstructions against movement therethrough), the process of camera path determination can take into account the full ambient space, rather than just walkable surfaces or some other limitation, and incorporate the notion of dense visibility into the computation, yielding a "visibility roadmap". A dense visibility roadmap in which each node corresponds to a local volume of space that overlaps with the volume of adjacent nodes is possible, especially when this is computed ahead of time so that it need not be done in real-time. Movement within and between these clear subvolume bounds is guaranteed to be collision free (where each clear subvolume is entirely clear), and an estimate of the percentage of visibility of all other nodes within a falloff distance can be readily available. At runtime, the planning process involves the use of precomputed visibility values to find a coarse, global path, and a refinement method is used for fine-scale adjustments.

By structuring the problem as a global search on a precomputed visibility roadmap together with local runtime refinement, sophisticated camera transitions are possible, such as collision-free paths from a start point to an end point that emphasize visibility while maintaining real-time performance. Because it is global in nature, this method can generate large-scale camera transitions between distant points in a scene, even in complicated geometric situations. In addition to this, this approach can be extended to handle dynamic scenes, it can be used to enhance third-person camera models, perform risk prediction, and/or include additional constraints. Computation time is typically output sensitive, so that large camera transitions might take tens of milliseconds, while shorter ones might be computed in one to four milliseconds.

FIG. 3 is an illustration of a specific implementation of a roadmap and illustrates a visibility graph structure generation process. FIG. 3 comprises FIGS. 3(a), 3(b), 3(c) and 3(d).

As illustrated in FIG. 3(a), first, the environment (the virtual space occupied by objects in scenes to be rendered) is divided into subvolumes (spatial discretization), in this case they are overlapping spheres. The entire clear space can be occupied by overlapping spheres. As illustrated in FIG. 3(b), the overlap between adjacent spheres defines a set of "portal" regions that permit passage from one sphere to the next. Next, a graph structure is built and stored in memory wherein nodes of the graph structure represent portals and edges represent spheres.

Thus, a path that traverses from one portal of a sphere to another portal of the sphere would be represented by an edge and a path of the graph would correspond to a path through spheres via portals. Finally (or independently of the portal generation and graph construction), the computing device can calculate visibility measures for pairs of subvolumes. The visibility can be approximate and refined at runtime once a smaller set of traversed subvolumes is considered out of all possible subvolumes.

In other instances, the portals are created not with overlapping spheres, but by using BSP trees, octrees, KD-trees, etc. From reading this disclosure, it should be apparent to one of ordinary skill in the art how to create a number of portals using BSP trees, octrees, KD-trees, or the like.

For each pair of spheres, a visibility probability can be computed using Monte-Carlo ray tracing. The visibility measure might be strictly based on visibility alone, or might incorporate other considerations. For example, a bias towards lower camera paths (closer to the surface illustrated at the bottom of FIG. 3) can be had by including a measure of distance from the surface into the cost function used. See Equation 2, below, for one example.

Other spatial data structures besides spheres were considered, such as BSP-trees, KD-trees, and octrees, but initial experiments indicate that the simplicity, both algorithmically and geometrically, of a spherical division may well be most efficient. With spheres, portals are defined by the circle of overlap between two spheres. The roadmap is a graph structure derived from the spheres and portals by placing a node at the center of each portal and connecting this node to all other portal nodes associated with either of the two overlapping spheres. By traveling entirely within the network of spheres (transitioning from sphere to sphere via the portals), the camera is guaranteed never to collide with scene geometry. As soon as a camera focus point is fixed, an estimate of the visibility of the focus point from any query point within the scene is known immediately by looking up the precomputed visibility probability between the query point's sphere and the focus point's sphere.

In some embodiments, the ambient space is approximated with a flat hierarchy of overlapping spheres using iterative sphere placement. In such a process, first the scene geometry (comprising the virtual objects and possibly other considerations) is embedded within a three-dimensional grid with spacing $\Delta x$. Any grid cells that intersect scene geometry are marked as occupied. A candidate sphere of maximal size is constructed at each unoccupied grid cell. To favor uniformity in sphere and portal size, radii might be restricted to the range $[\Delta x/3, 3\Delta x]$ and any candidate with a portal area less than $\Delta x/4$ is discarded. Other thresholds could be used instead.

Next, a seed sphere is selected, possibly at random. Then, in each step of the iteration, the computing device that is generating the graph selects from the candidates the sphere that maximally overlaps the previously selected spheres, creating the largest portals. Grid cells whose centers lie within the new sphere are marked as occupied and the corresponding candidates are deleted. The process repeats until no candidate spheres remain. Although not strictly hierarchical, a finer grid (smaller $\Delta x$) can first be used in areas with smaller features (e.g., the inside of a house) followed by a coarser grid on the surrounding scene (e.g., the streets of a village). In specific implementations, $\Delta x$ might vary between 5 and 15 meters for a scene with appropriate sized structures. The exact grid dimensions of some examples are given in FIG. 12.

In specific embodiments, a final precomputation step estimates a visibility probability between all pairs of spheres using a Monte Carlo approach that selects a random (or other selected) point on the hemisphere of a source sphere $S_i$ facing a destination sphere $S_j$. A ray is shot toward a second random (or other) point on the opposing hemisphere of sphere $S_j$. The visibility probability $p_{i,j}$ between spheres $S_i$ and $S_j$ is then given by the fraction of rays that reach the destination sphere before hitting an obstacle.

To limit the amount of computations for very large environments, the process can be done taking into account a maximal visibility distance that specifies how much of a level is typically in view. In those embodiments, the visibilities for spheres that are further away from each other than the maximal visibility distance need not be precomputed. Additionally, criteria other than distance could be used to limit the visibility computations. For example, view direction might be used to limit computations, or the status of subspaces being indoors or outdoors. In the general case, if the system knows that there is no need for certain pairings, or dictates that the camera cannot use such pairings, the spheres (or subspaces in the more general example) of that pairing are given a visibility probability of zero. For example, if there is some constraint that dictates that the camera is not to leave the room, the visibility probabilities for the subspaces outside the room can be set to zero for all or some pairings, which can reduce the amount of computation by reducing the need to estimate visibility and reducing the search space for finding transitions.

Another limitation on computational effort is to have the system determine what short cuts are available, such as path variations, and take those short cuts when the result is close enough that it doesn't matter enough to be precise.

Visibility Transition Planning

Visibility transition planning refers to the problem of finding the shortest collision-free camera transition from a start position $P_s$ to an end position $P_e$ such that a focus point $P_f$ is visible for as much of the path as possible, or finding sufficiently short transitions with good visibility. The representation of the result of computation of visibility transition planning can be a camera path, which might be an ordered list of points in the environment beginning with $P_s$ and ending with $P_e$.

A runtime system can execute a visibility-based path-planning process using the precomputed roadmap data structure to find a coarse collision-free path through a scene and then a fine-scale refinement can be performed by computing a sequence of GPU-assisted occlusion maps in spheres of partial visibility. A final smoothing step can shorten the path length by allowing it to hug the sphere portals tightly, if desired. This can also be generalized, as explained herein, to work with nonsphere portals.

Path Planning on the Roadmap

The first stage of the runtime system computes a coarse path from the sphere containing $P_s$ to the sphere containing $P_e$ along the visibility roadmap. One approach for computing the coarse path is to use a conventional A* search, such as the generalized best-first search described in [Dechter] and elsewhere. A detailed description of the search is not needed here, as it would be easily obtained by one of ordinary skill in the art.

A* uses an edge cost function, C, and finds paths of minimal cost. A path heuristic, H, provides a lower bound on the remaining cost of a partial path and is used to accelerate the search. The typical shortest-path A* search uses edge length as the cost function and Euclidean distance as the heuristic. This can be augmented with the edge length cost including the precomputed visibility probability in order to find paths that maximize the visibility of a focus point. Thus, the cost for edge $e_{ij}$ between nodes i and j can be given by Equation 1, where d(i,j) is the length of the edge $e_{ij}$ (the Euclidean distance between nodes i and j) and $v(e_{ij})$ is the visibility probability with respect to the camera focus point.

$$C(e_{ij})=d(i,j)+\alpha d(i,j)(1-v(e_{ij})) \qquad \text{(Eqn. 1)}$$

Due to the construction of the roadmap, each edge lies entirely within a given sphere. Thus, $v(e_{ij})=p_{k,f}$ can be used, where $p_{k,f}$ is the precomputed visibility probability between the edge's sphere, $S_k$, and the sphere, $S_f$, containing the focus point $P_f$. This value represents the probability of seeing $P_f$ while traveling along edge $e_{ij}$. The parameter $\alpha$ determines the relative cost of traveling in regions where $P_f$ is visible versus regions where $P_f$ is occluded. If $\alpha$ is chosen to be larger than the maximal distance of any path through the roadmap, the above process will find the path that travels as quickly as possible into the visibility region. For the heuristic function H of the A* search, one approach is to use the Euclidean distance between the last point on the path and the target: H(n)=d(n,e).

Path Refinement

One result of the above computation is a path P along the edges of the roadmap, through the roadmap's spheres. Spheres with a visibility probability of either 0 or 1 are entirely outside or entirely inside of the visibility region with respect to the focus point, while those with a probability between 0 and 1 are in partial visibility. The focus point may be visible from some positions within the sphere and hidden from others. In order to increase the accuracy of the results, the computing device can perform a detailed refinement step in such spheres so that the computed path navigates the positions where the focus point is actually visible.

Path refinement for spheres with partial visibility can be simplified from a three-dimensional problem to a two-dimensional problem, since one dimension is determined by the line of sight to the focus point. The system can build a detailed representation of the focus point's visibility within the sphere in the form of a 2D occlusion map, which contains per-pixel information indicating whether $P_f$ is visible from a given position within the sphere. The occlusion map can be computed at runtime by rendering the scene from the point of view of the focus point, as is known (see, for example, [Halper]), using a view frustum that is tightly fit around the sphere. The system can perform another A* search on this occlusion map. 2D path positions on this map that change visibility are detected and reconstructed in 3D.

FIG. 4 illustrates an example of a path planning and refinement process. FIG. 4(a) illustrates an environment, a start point, an end point and a focus point. FIG. 4(b) illustrates an initial path along portals and sphere edges. FIG. 4(c) illustrates post-processed paths within the overlap regions. FIG. 4(d) illustrates a finished camera path.

Although the occlusion maps provide detailed visibility information, rendering them at runtime for every sphere during path planning could be prohibitively expensive because the computing device using the A* search might have to explore hundreds of nodes as it searches for the optimal path. In the novel approach described herein, precomputed visibility probability estimates require only a table lookup during the coarse path planning Once the coarse path is fixed, only a few spheres will lie in partial visibility due to the nature of the search. The computing device can afford to compute the more accurate occlusion maps on these few spheres without exceeding the device's allotted computation budget. Thus, the computation is spent where it is needed most to build the best path.

Figure 5A:
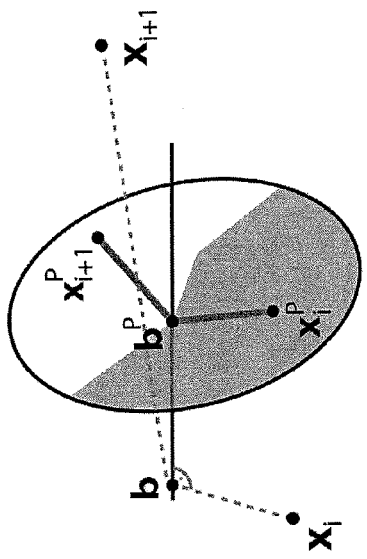
FIG. 5 is usable to explain minimizing on occlusion maps the distance traveled in the occluded region.
Figure 5B:
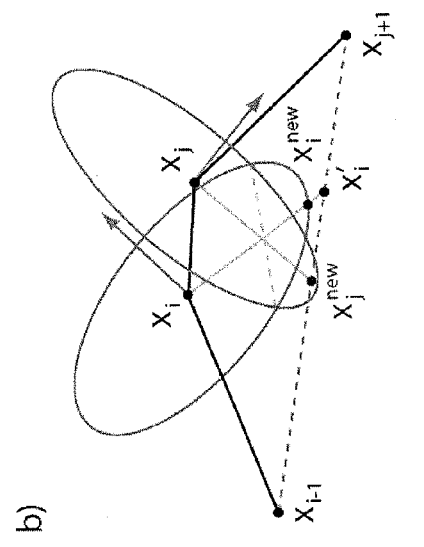

FIG. 5 illustrates this process and is usable to explain minimizing on occlusion maps the distance traveled in the occluded region (shown in shaded region). FIG. 5 comprises FIGS. 5(a) and 5(b). The distance traveled in the occluded region (the shaded area in FIGS. 5(a)-(b)) is minimized on occlusion maps. FIG. 5(a) illustrates the 2D plane of the occlusion map, while FIG. 5(b) shows how the 3D positions of the points are computed for the actual path.

The start and end points of the 2D path search on the occlusion map are given by projecting the points on P that enter and exit the sphere onto the map-plane. The entry position $x_i$ and exit position $x_{i+1}$ lie on the two overlap circles of the sphere and its predecessor and successor sphere, respectively. The projected positions are denoted by $x_i^p$ and $x_{i+1}^p$ in FIG. 5(a). A path planning, similar to the one described in the previous section is performed on the occlusion map pixels, where each pixel is considered connected to its eight neighbors. The distance d(i,j) and visibility values for C are replaced by functions computed on the occlusion map. The value d(i,j) is the 2D Euclidean distance, and $v(x_{ik})$ is the average of the two per-pixel visibilities.

Once the occlusion map path has been calculated, the 2D path positions can be reconstructed in 3D. For each pixel, the 3D position can lie anywhere on its projection ray toward the focus point within the sphere. The reconstruction of the start and end points, $x_i^p$ and $x_{i+1}^p$, are known from the projections of their 3D positions $x_i$ and $x_{i+1}$ onto the map. Next, border points $b^p$ are identified on the 2D path. Border points are points on the path where the visibility changes from occluded to visible, or vice versa. For each occluded region on the map, such a border point is minimizing the path length in the occluded area. This implies that the occluded part is a straight line. That means that for the construction of the 3D position of the border point and the path segment in the occlusion region it is enough to project the border point to 3D. Its 3D position, b, is given by the closest point on its view-line segment to either $x_i$, or $x_{i+1}$, as shown in FIG. 5(b). On the other hand, the portions of the 2D path that are fully visible do not necessarily form a straight line. To avoid errors introduced by approximating visible portions of the path also by a line between $b^p$ and its neighbor, additional points can be iteratively inserted in 2D and reconstructed in 3D as the closest point to the line formed by its 3D predecessor and successor.

Path Post-Processing

Although the coarse planning and refinement determines the gross nature of the camera path, the actual path traversed by the camera can be freely moved anywhere within the selected portals without colliding with geometry or changing the visibility score. The system can use these additional degrees of freedom to smooth the path, creating both shorter and more natural camera movement.

Figure 6A:
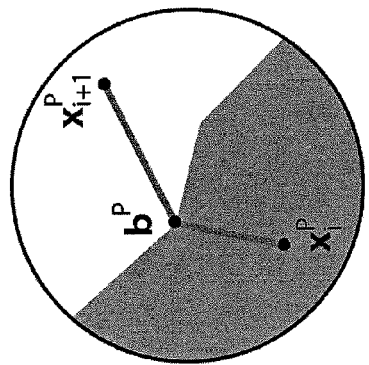
FIG. 6 illustrates path post-processing computation to smooth point positions.
Figure 6B:
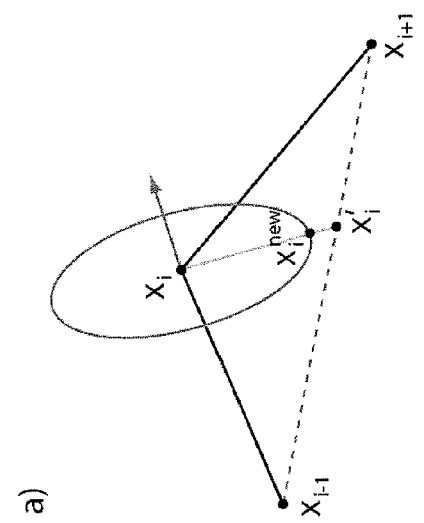

FIG. 6 illustrates path post-processing computation to smooth point positions $x_i$ that lie on the portals. FIG. 6 comprises FIGS. 6(a) and 6(b). FIG. 6(a) shows the standard case of smoothing on a single portal; FIG. 6(b) shows the procedure for two overlapping portal circles.

The final path positions $x_i$ can be computed using a constrained iterative smoothing process. The corrected position, $x'_i$, of each point $x_i$ is first found as the intersection of the line from $x_i$ to $x_{i+1}$ with the portal's plane. If the intersection point lies outside of the portal circle, it is moved to the nearest point on the circle boundary, as shown in FIG. 6(a). Note that due to the previous refinement of the path in partially visible spheres, either of $x_i$'s neighbors can be a reconstructed border point. These steps can be performed iteratively for all points of the path. This update can change the projected start and end positions on the occlusion maps, so the refinement as described above can be performed in an additional pass after each iteration. The final camera trajectory can be determined using conventional methods, such as Hermite interpolation of the path nodes described in [Farin].

Two special cases of post-processing can be considered. The first one is that of two overlapping portal circles. In such a situation, two neighboring points on a path, P, $x_i$ and $x_j$, can converge to a single point on the intersection line of the two circles, which prevents the points from moving further toward their smoothed positions. To resolve this problem, the method can include a combined update of both points if they are closer than a small threshold distance, $\epsilon$, as illustrated in FIG. 6(b). The second special case occurs when a portal is completely contained in the cylindrical volume of its two neighboring portal circles. As the contained portal does not contribute to the overall volume of the path, it can simply be discarded.

Applications and Extensions

Above, details have been described for a basic method and implementation of visibility transition planning, which includes the precomputed visibility roadmap as well as a runtime planning, refinement, and smoothing strategy for visibility-aware camera transitions. This functionality is useful in many situations as-is. However, games and interactive environments often have unique, specialized requirements, and one single camera model might not cater to all situations. However, the data structure and planning systems described herein can provide a foundation and tools to enable a variety of customized camera behaviors that can be specialized to the needs of a particular game or application. Below, description of some applications and extensions enabled by this are described.

Large Camera Transitions

Once a large camera transition has been computed, the most basic task is to move the camera along the path from the start point to the end point. Camera movement can be realized using a physically-based simulation to determine the camera's six degrees of freedom: position, pitch, yaw, and roll. A spring can be created for each degree of freedom between the actual position or orientation and the desired one (e.g., a location along the computed path). The model can be based on forward dynamics and integrated over time with an explicit leapfrog scheme. This physical camera model ensures smooth camera movement at the cost of small deviations in the exact camera path. In order to avoid collisions that could result from these deviations, a small safety buffer around scene geometry can be included during sphere creation.

A transition might zoom out from a close-up view in streets to a top down view from above. While the shortest path might quickly hide the focus point behind a skyscraper, a visibility aware transition can keep the target in focus until the last possible moment. Such transitions could assist in wayfinding tasks in virtual environments by providing a natural facility to connect egocentric and allocentric viewpoints without losing context to improve upon, for example, the approach in [Byrne].

Global Planning for Local Camera Control

The local camera model builds upon the global planning system in order to implement a camera that follows a moving target while striving to maintain visibility. It is analogous to the robotics problem of maintaining visibility and a fixed distance from a moving target, such as that described by [Murrieta-Cid2004], except in a complex 3D environment. If visibility is broken because a tracked character/avatar quickly ducks behind an obstacle, an unoccluded vantage is chosen via a ray-cast. While a naïve method might teleport the camera to the unoccluded point or make the occluding geometry artificially transparent, as described above with reference to FIG. 2, a preferred approach used here would have the path planner find a collision-free path to this position that regains visibility as quickly as possible. Whenever an aggressive movement results in an occlusion, the dynamic planning system can activate and the camera would quickly regain view. In this manner, planning can be triggered by a loss of visibility of a camera focus point from a camera view point.

Multi-Threaded Computation

The planning computations for the camera model can be constantly active in a thread running parallel to the game engine in a multi-threaded implementation, as this decouples the complexity of the visibility planning from an application's frame rate constraints. For rendering the occlusion maps, this parallelization can have synchronization of the GPU with the main rendering step.

Figure 7:
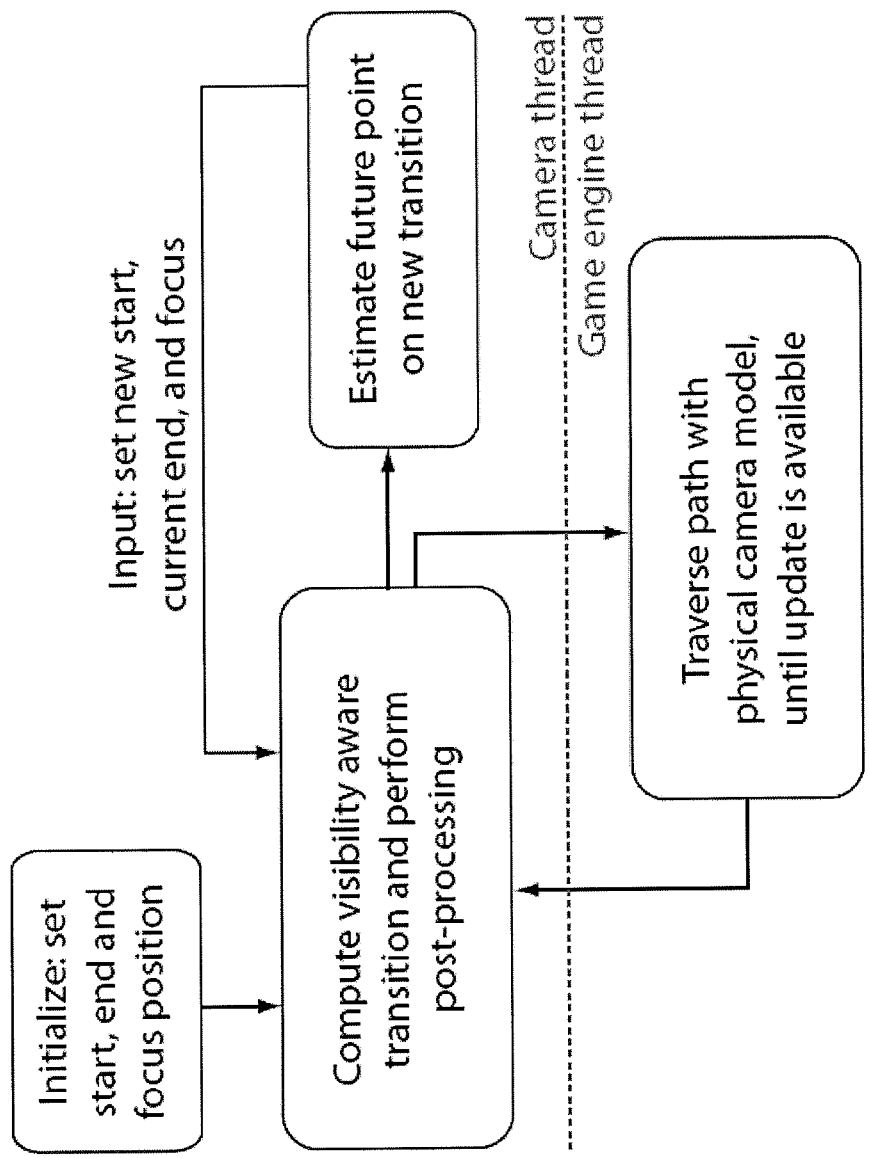
FIG. 7 is a flowchart of a process for implementation of a local camera model.

FIG. 7 is a flowchart of a process for implementation of a local camera model showing different states of a local camera model. By predicting a future start point on a given path based on the time it took to compute it, a new start position can be estimated. The new transition path can be computed in parallel while the camera travels along the current path.

Risk Prediction

Figure 8:
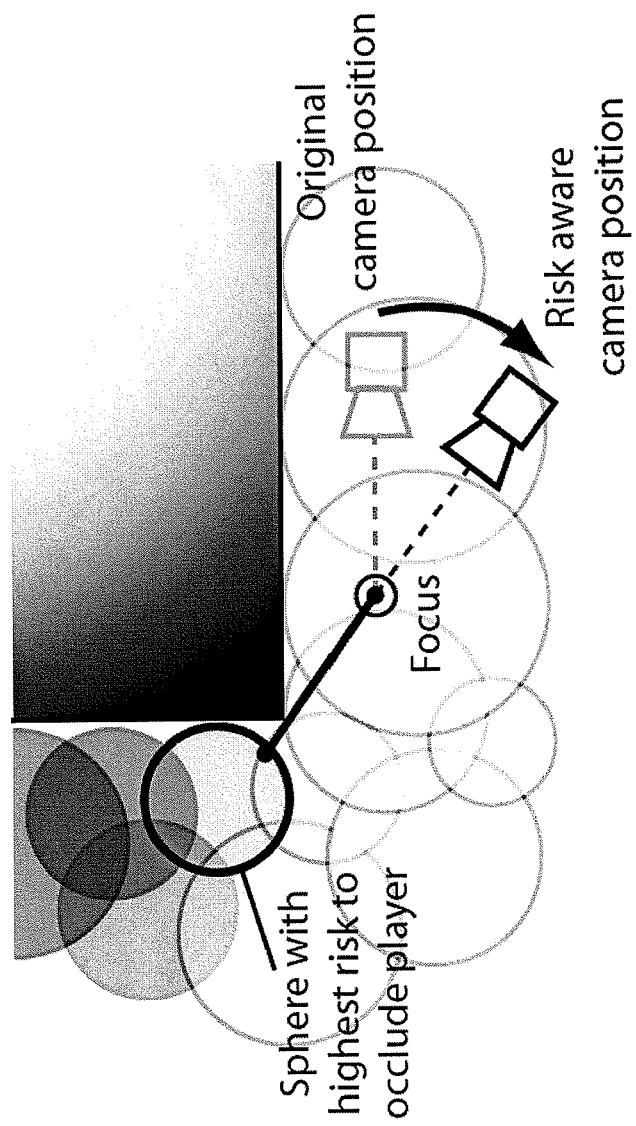
FIG. 8 illustrates proactive camera movement.

FIG. 8 illustrates proactive camera movement, wherein a process is performed by the engine to find the closest sphere (indicated) that has reduced visibility from the original camera position. A purely reactive camera controller cannot keep a fast moving player in view at all times. In order to anticipate situations in which the player might escape the camera's region of visibility, the system can perform target tracking. The data structure and path planning code would permit an efficient implementation that adjusts the camera position in an effort to prevent the player from escaping view. This risk prediction uses the visibility roadmap and planning architecture to find a path to the sphere closest to the player which is not visible from the camera's current position. This path represents the highest risk of escape. The camera's current position is rotated to a new vantage so that this escape route is in view. The transition planning system is used to move the camera to this new vantage point.

As illustrated in the figure, after detecting a high escape risk, the camera's viewing direction is aligned towards this sphere. Spheres with reduced visibility from the original camera position are shown in darker shades of gray.

Camera Target Switching

Taken together, global planning for local camera control and multi-threaded computation enable target switching, where the camera's focus point switches between multiple players/avatars/focus points at the same time. Such a system could be used in a "spectator mode" where an outside spectator is observing the progress of a multi-player game. See, for example, FIG. 9(a). The level design includes a house and tunnel, which creates indoors that are completely invisible from outside. As the focus dynamically changes between the two players, visibility transition planning results in camera transitions that bring the new player into focus as quickly as possible. The smooth transitions give the viewer a sense of the environment's layout and the distance between the two players, which would not be conveyed if immediate camera cuts were used instead.

Figure 9A:
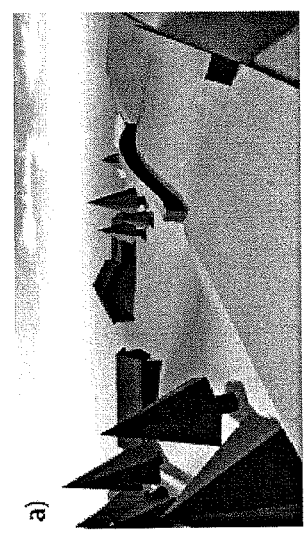
FIG. 9 illustrates example game environments.
Figure 9B:
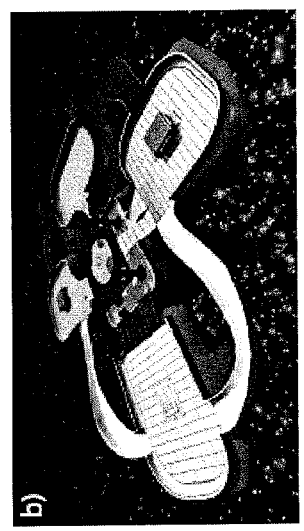
Figure 9C:

FIG. 9 illustrates three game environments; FIG. 9(a) shows a woodland scene with an underground corridor, where complex transitions between two players are needed between focus points; FIG. 9(b), where an arena is shown—a typical multi-player level; and FIG. 9(c) showing a city environment.

Dynamic Environments

Often, real-time environments contain dynamic elements, such as closing doors or moving obstacles, and it is crucial that the camera takes these into account when moving through the scene. To enable the computation of visibility transitions in dynamic environments, on-the-fly updates of the information in the roadmap are made possible. The moving objects can be approximated by one or more bounding spheres. When computing the A* search on the roadmap, mark all connections between two portal circles that touch the bounding spheres as being occupied. This prevents the camera from colliding with the moving object. To update the visibility information, project the bounding sphere of the object onto the spheres of the roadmap from the direction of the focus point. All roadmap spheres within this cone are marked as having an occluded view of the focus point. During the path refinement, project the actual geometry of the moving object onto the occlusion maps, to make the camera take into account the actual shape of the object.

Figure 10A:
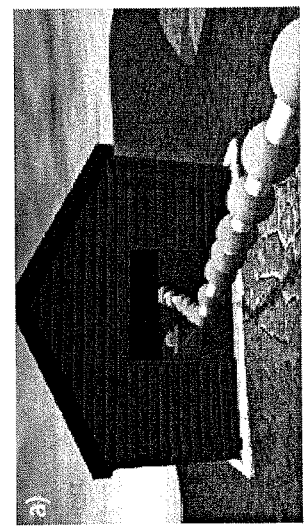
FIG. 10 illustrates example camera paths taking into account dynamic environments.
Figure 10B:
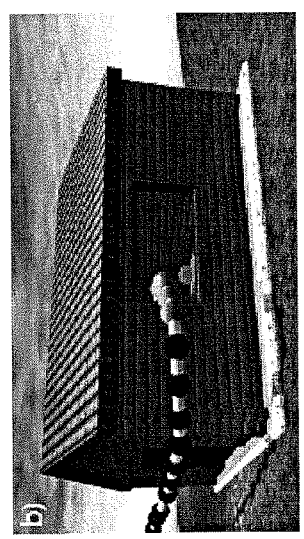
Figure 10C:
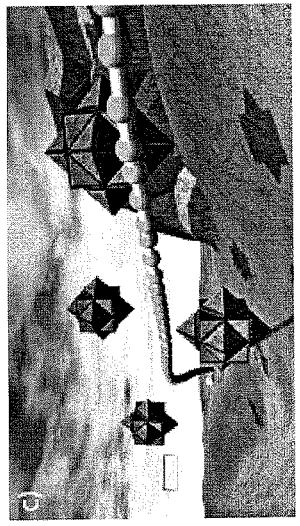

FIG. 10 illustrates example camera paths taking into account dynamic environments (e.g., where objects, start points, end points and/or focus points move while the camera is following a camera path). FIG. 10 comprises FIGS. 10(a), 10(b) and 10(c). An example of the camera taking into account actual shapes is shown in the two examples of FIG. 10.

The first example (FIG. 10(a)) covers a typical game setting where a door to a house is closing while the camera is entering it. As long as the door is open, the process generates a camera path through the door. The system dynamically adapts to the changed visibility setting and takes a detour through the window of the house. FIG. 10(b) shows the path after the door closes—an alternative route around the side of the house is found. In another scene (FIG. 10(c)), the device can find collision-free and unoccluded paths through multiple moving objects. Depending on the current configuration of the obstacles, the camera will move to different sides to get a clear view of the focus point.

Additional Search Criteria

In some situations, an application might have additional constraints for the search path, such as a path through a game level might require the camera to move along the ground, in a similar way that a player would move, instead of taking a shortcut through the air. The system can modify its search framework to include additional constraints by modifying the cost function of the A* search. For the example above, a height constraint could be included to make the camera move within a certain region above ground. To do this, add an additional penalty term to Equation 1. This gives us a modified cost function of Equation 2, where $h(e_{ij})$ evaluates to 0 if the edge $e_{ij}$ is within a given height range, and increases to 1 if the edge is above or below this region.

$$C(e_{ij})=C(e_{ij})+\alpha^2 d(i,j)h(e_{ij})$$ (Eqn. 2)

The weight of $\alpha^2$ makes sure that this constraint is prioritized over the visibility. This allows for visibility aware paths traveling along the ground, instead of flying over the houses and other objects. This constrained search could easily be extended by a variety of penalty terms, e.g., a weight term specified by a level designer to make the camera prefer landmarks in the environment from a certain angle or region.

Yet another set of additional search criteria that might be used are criteria that model cinematic considerations, using framing constraints or transitions based on a director's input or modeled after cinematic rules of thumb regarding camera movement and areas of avoidance. For example, while a path might fully allow a camera to veer arbitrarily close to a non-occluding wall, such movement might distract the viewer and therefore might be something to be avoided.

Statistics

Runtime and precomputation statistics of the environments are given in FIG. 12. The roadmaps in these examples for the different environments have between 800 and more than 3000 spheres. The precomputation times, the majority of which are used to compute sphere visibilities, vary from 8 seconds to around 61 seconds (and times could be faster or shorter), and directly depend on the number of spheres, together with the visibility distance. The average path search and post-processing times mostly depend on the length of the transitions. For the local models used in the Arena, this takes 1.8 ms on average, while the long transition with dynamic objects demonstrated in the tea house example require almost 30 ms. Note that these path computations can be performed in a thread parallel to the game engine, to avoid changes in the frame rate.

Variations

In addition to basic systems described herein, more complex systems might be implemented. For example, instead of having only one camera focus point, there might be more than one camera focus point to consider for simultaneous viewing, or where the camera focus is directed at an object in its entirety (i.e., instead of working on one point being visible over the camera path, the whole object should be visible over the path, or two avatars should be visible, etc.) This might be done by aggregating visibility estimations for multiple focus targets during the camera path search and superimposing occlusion maps during a refinement phase.

In a hierarchical approach, there might be "highway" path segments and "local road" path segments. These might be useful where better performance is needed. A dense sampling of the ambient space using small subvolumes might provide better paths, but take more computational effort. Accurately sampling small regions of the environment may require tiny subvolumes, which may lead to more accurate visibility estimations, risk predictions and better camera paths. However, extremely dense roadmaps may impede performance. As a compromise, a level-of-detail approach for the visibility roadmap might be used, where "highways" are traveled for large distances, and "local roads" are used for more fine-scale movement.

Achieving an unoccluded view of an object is one goal of camera control. In another variation, achieving a maximally occluded position might be the goal. In more complex variations, higher-level goals, such as those defined by cinematographic rules, might be used to influence perceptual aspects of the computed transitions to convey different styles or moods. In specific embodiments, artist-created camera paths are copied during transition planning, so that greater control over the character of the transitions is given to the user.

Hardware Example

Figure 13:
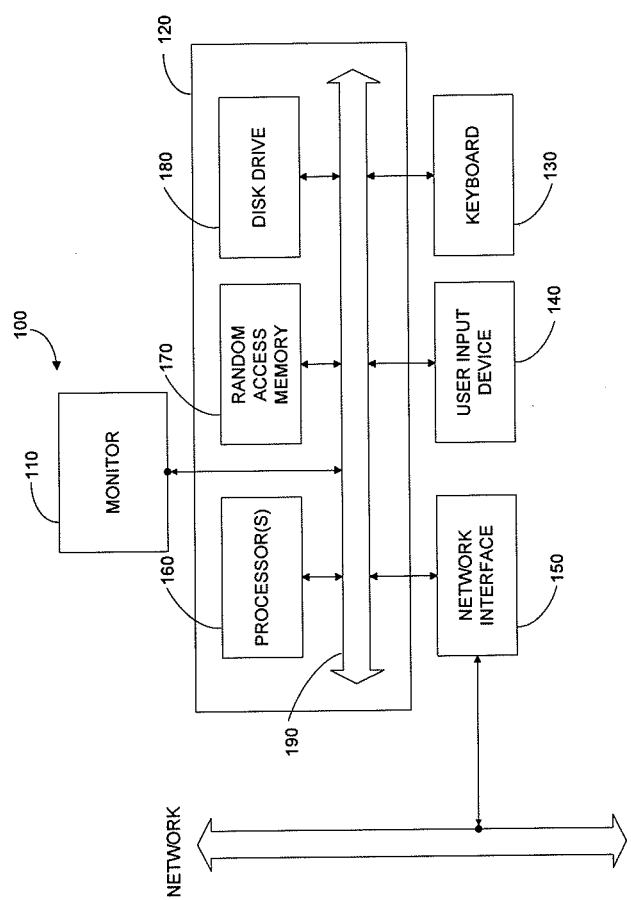
FIG. 13 illustrates an example hardware setup for performing techniques described herein.

FIG. 13 illustrates an example system 100 for animation management according to an embodiment of the present invention. In the presently described embodiment, computer system 100 typically includes a monitor 110, computer 120, a keyboard 130, a user input device 140, computer interfaces 150, and the like. Images and frames can be generated, stored in memory or hard disk storage, and processed. The interfaces and/or memory might also be used to provide the metadata about an image, objects in the virtual space and other considerations.

In various embodiments, display/monitor 110 may be embodied as a CRT display, an LCD display, a plasma display, a direct-projection or rear-projection DLP, a microdisplay, or the like. In various embodiments, monitor 110 may be used to visually display images, or the like, as well as being part of an interactive environment.

In the present embodiment, user input device 140 is typically embodied as a computer mouse, a trackball, a track pad, a joystick, wireless remote, drawing tablet, voice command system, eye tracking system, and the like. Embodiments of network interface 150 typically include an Ethernet card, a modem (telephone, satellite, cable, ISDN), (asynchronous) digital subscriber line (DSL) unit, FireWire interface, USB interface, and the like. For example, network interface 150 may be coupled to a computer network, to a FireWire bus, or the like. In other embodiments, network interface 150 may be physically integrated on the motherboard of computer 120 and/or include software drivers, or the like.

In various embodiments, computer 120 typically includes familiar computer components such as a processor 160, and memory storage devices, such as a random access memory (RAM) 170, disk drives 180, and system bus 190 interconnecting the above components. RAM 170 or other memory might hold computer instructions to be executed by one or more processors as a mechanism for effecting some functionality described herein that is implemented in software. In one embodiment, computer 120 includes one or more Core™ microprocessors from Intel. Further, in the present embodiment, computer 120 typically includes a UNIX-based operating system.

RAM 170 and disk drive 180 are examples of computer-readable tangible media configured to store embodiments of the present invention including computer-executable code implementing techniques described herein, data such as image files, object/scene models including geometric descriptions of virtual objects, images, camera paths, procedural descriptions, a rendering engine, executable computer code, and/or the like. Other types of tangible media may include magnetic storage media such as floppy disks, networked hard disks, or removable hard disks, optical storage media such as CD-ROMS, DVDs, holographic memories, and/or bar codes, semiconductor memories such as flash memories, read-only-memories (ROMS), battery-backed volatile memories, networked storage devices, and the like.

In various embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, a graphical processor unit or "GPU", may be used to accelerate various operations. Such operations may include determining image rendering, camera movements, view alterations, camera paths or other processes.

FIG. 13 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Xeon™, Pentium™ or Itanium™ microprocessors from Intel; Turion™ 64 or Opteron™ microprocessors from Advanced Micro Devices, Inc; and the like. Further, other types of operating systems are contemplated, such as Vista™ or Windows XP™ or the like from Microsoft Corporation, Solaris™ from Sun Microsystems, Linux, Unix, or the like.

In still other embodiments, the platform is a gaming system, such as Microsoft's Xbox 360™ game console, Sony's Playstation 3™ console, or Nintendo's Wii™ console.

In still other embodiments, the techniques described above may be implemented upon a chip or an auxiliary processing board. Many types of configurations for computational devices can be used to implement various methods described herein. Further, processing components having different levels of computational power, e.g., microprocessors, graphics processors, RISC processors, embedded processors, or the like can also be used to implement various embodiments.

Using system 100, camera paths can be determined, used and presented.

Further embodiments can be envisioned to one of ordinary skill in the art after reading this disclosure. In other embodiments, combinations or sub combinations of the above disclosed invention can be advantageously made. The example arrangements of components are shown for purposes of illustration and it should be understood that combinations, additions, re arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. In a computer-implemented animation or gaming system that maintains a geometric model space having coordinates in order to generate one or more images representing virtual objects in that geometric model space within a time allotted for a computing system to generate the one or more images from a camera view position in the geometric model space based on a computer-readable input of a set of virtual objects positioned in the geometric model space and parameters of the geometric model space, wherein the animation or gaming system will generate a display of the objects in the geometric model space as viewed from the camera view position and perform operations based on visibility, a method of computing a camera path, comprising:

dividing the geometric model space into clear subvolumes, wherein a subvolume defines a space within the geometric model space that has nonzero volume and a clear subvolume is a subvolume that does not contain any virtual objects that are not allowed to be traversed;

building a graph structure, representable in electronic storage, the graph structure having nodes representing transition locations between adjacent clear subvolumes and edges representing transitions from one transition location in a given clear subvolume to another transition location in the given clear subvolume;

computing visibility weights for pairs of clear subvolumes, independent of a camera focus point and/or independent of the camera view position, wherein a visibility weight corresponds to a visibility measure between the clear subvolumes of the pair;
generating a computer-readable pair data structure having values corresponding to the visibility weights;
determining a path time period over which the camera view position is to change from a start point to an end point along a camera path;
determining a camera focus point in the geometric model space, wherein the camera focus point is a point or location in the geometric model space that the animation or gaming system will attempt to keep in view, wherein view is determined, at least in part, based on at least an approximation of whether opaque virtual objects are positioned along a ray spanning from the camera focus point to the camera view position as the system moves the camera view position over the camera path;
determining a preferred coarse path along the graph structure from a starting clear subvolume to an ending clear subvolume taking into account the visibility weights for pairs of clear subvolumes wherein one of the pair is a subvolume containing the camera focus point; and
determining the camera path from the preferred coarse path.

2. The method of claim 1, wherein the set of virtual objects includes at least one object that is not entirely opaque and for pairs of clear subvolumes that are at least partially visible from each other through the not entirely opaque object, the visibility measure for that pair takes into account the opacity or transparency of the not entirely opaque object.

3. The method of claim 1, wherein subvolume division comprises dividing the geometric model space into clear subvolumes and at least one subvolume that is not entirely clear in that it shares nonzero volume with a virtual object that is not allowed to be traversed by a camera.

4. The method of claim 1, wherein subvolume division comprises dividing the geometric model space into one or more of a set of spheres, a voxel grid, a set of octrees, a set of BSP-trees or a set of KD-trees.

5. The method of claim 1, wherein subvolume division comprises dividing the geometric model space into overlapping subvolumes.

6. The method of claim 1, wherein the visibility measure between a pair of clear subvolumes is related to visibility along rays from points in each of the clear subvolumes.

7. The method of claim 1, wherein a cost function used includes, with the visibility measure, at least one variable along rays from points in each of the clear subvolumes that is not related to visibility.

8. The method of claim 7, wherein the at least one variable that is not related to visibility is a height variable such that a camera path is computed taking into account the height of a camera view position in the geometric model space.

9. The method of claim 1, further comprising updating the graph structure and the visibility weights to take into account movements of one or more objects of the set of virtual objects.

10. The method of claim 9, wherein updating comprises:
deleting clear subvolumes from the graph structure as they are occupied by moving objects that are not allowed to be traversed;
removing edges that were within deleted clear subvolumes; and
altering the visibility weights to take into account shadows cast by moving objects.

11. The method of claim 1, wherein determining a camera path from the preferred coarse path comprises smoothing the preferred coarse path to derive a fine path and using the fine path as the camera path.

12. The method of claim 11, wherein the fine path and the coarse path traverse the same set of portals and the fine path is computed using a constrained iterative smoothing process.

13. The method of claim 1, wherein the fine path is determined from the coarse path and a simulation model of a physical camera based on forward dynamics and integrated over time.

14. The method of claim 1, further comprising generating an animation sequence that corresponds to moving a camera from the start point to the end point while viewing virtual objects in view at the camera focus point from the camera view position.

15. The method of claim 1, wherein the graph structure is built, and the visibility weights are calculated, entirely in advance of a determination of the start point, the end point or the camera focus point.

16. The method of claim 1, further comprising:
determining possible changes in position of one or more of the start point, the end point and/or the camera focus point; and
adjusting the camera path to account for the possible changes in position.

17. The method of claim 16, wherein the camera focus point is a point associated with a character in a game and the camera path is for providing a view of that character as the camera view position moves.

18. The method of claim 1, further comprising:
when the camera focus point moves to a new position, recalculating the camera path, using the graph structure for the prior camera focus point position or recalculating graph weights of the graph structure to form an updated graph structure and using the updated graph structure for coarse path determination.

19. The method of claim 1, wherein determining the preferred coarse path along the graph structure comprises determining a global maximum visibility path that maximizes or minimizes a proportion of the path time period in which the camera focus point is visible from the camera view position.

20. The method of claim 1, wherein one or more of the start point, the end point, and/or the camera focus point are represented in memory by an association with a containing subvolume.

21. The method of claim 1, wherein determining the path time period comprises determining a path length and basing the path time on the path length.

22. The method of claim 1, wherein building a graph structure comprises building a graph structure taking into account only subvolumes that meet a proximity threshold or other threshold that eliminates at least one subvolume from consideration.

23. The method of claim 1, wherein the path time is measured in real-time measures or measured in number of frames.

24. The method of claim 1, wherein the camera path is equal to the preferred coarse path and/or is derived from the preferred coarse path using occlusion maps generated after the start point, end point and camera point are known.

25. The method of claim 1, further comprising:
predicting possible new locations for the camera focus point; and
altering the camera path to account for the possible new locations to increase a probability that the camera focus point will remain visible from the camera path as the camera focus point moves.

26. The method of claim 1, wherein determining the camera path from the preferred coarse path further comprises:
  determining a current camera view position on a current camera path;
  updating the stored location for the start point to match the current camera view position or an estimation of a current camera view position following a current iteration of determining a current camera view position; and
  recalculating the camera path using the updated start point.

27. A computer-implemented animation or gaming system that includes storage for elements of a geometric model space, the space having coordinates in order to generate one or more images representing virtual objects in that geometric model space within a time allotted for a computing system to generate the one or more images from a camera view position in the geometric model space based on a computer-readable input of a set of virtual objects positioned in the geometric model space and parameters of the geometric model space, wherein the animation or gaming system further includes an output usable for generating a display of the objects in the geometric model space from output data, as viewed from the camera view position and usable to perform operations based on visibility, the system comprising:
  one or more computer-readable tangible media configured to store subvolume details that represent a partition of the geometric model space into clear subvolumes, wherein a subvolume defines a space within the geometric model space that has nonzero volume and a clear subvolume is a subvolume that does not contain any virtual objects that are not allowed to be traversed; a graph structure; and visibility weights;
  a processor coupled to the one or more computer-readable tangible media, the processor being configured to:
    generate the graph structure, the graph structure having nodes representing transition locations between adjacent clear subvolumes and edges representing transitions from one transition location in a given clear subvolume to another transition location in the given clear subvolume;
    generate values for visibility weights for pairs of clear subvolumes, independent of a camera focus point and/or independent of the camera view position, wherein a visibility weight corresponds to a visibility measure between the clear subvolumes of the pair;
    generate a computer-readable pair data structure having values corresponding to the visibility weights;
  the one or more computer-readable tangible media being further configured to store a path time period value representing a period over which the camera view position is to change from a start point to an end point along a camera path;
  the one or more computer-readable tangible media being further configured to store a camera focus point in the geometric model space, wherein the camera focus point is a point or location in the geometric model space that the animation or gaming system will attempt to keep in view, wherein view is determined, at least in part, based on at least an approximation of whether opaque virtual objects are positioned along a ray spanning from the camera focus point to the camera view position as the system moves the camera view position over the camera path;
  the one or more computer-readable tangible media being further configured to store a preferred coarse path, wherein the preferred coarse path is a path along the graph structure from a starting clear subvolume to an ending clear subvolume taking into account the visibility weights for pairs of clear subvolumes wherein one of the pair is a subvolume containing the camera focus point; and
  the processor being further configured to refine the camera path from the preferred coarse path.

28. The system of claim 27, wherein the set of virtual objects includes at least one object that is not entirely opaque and for pairs of clear subvolumes that are at least partially visible from each other through the not entirely opaque object, the visibility measure for that pair takes into account the opacity or transparency of the not entirely opaque object, and wherein the geometric model space is divided into clear subvolumes and at least one subvolume that is not entirely clear in that it shares nonzero volume with a virtual object that is not allowed to be traversed by a camera.

29. The system of claim 27, wherein subvolume division comprises dividing the geometric model space into one or more of a set of spheres, a voxel grid, a set of octrees, a set of BSP-trees or a set of KD-trees.

30. The system of claim 27, wherein subvolume division comprises dividing the geometric model space into overlapping subvolumes.

31. The system of claim 27, wherein the visibility measure between a pair of clear subvolumes is related to visibility along rays from points in each of the clear subvolumes.

32. The system of claim 27, wherein a cost function used includes, with the visibility measure, at least one variable along rays from points in each of the clear subvolumes that is not related to visibility.

33. The system of claim 27, wherein the camera path is a path determined from the preferred coarse path using smoothing of the preferred coarse path into a fine path used as the camera path and the one or more computer-readable tangible media are further configured to store the fine path, wherein the fine path is computed using a constrained iterative smoothing process or a simulation model of a physical camera based on forward dynamics and integrated over time.

34. The system of claim 27, wherein one or more of the start point, the end point, and/or the camera focus point are represented in memory by an association with a containing subvolume.

35. The system of claim 27, wherein the graph structure is built taking into account only subvolumes that meet a proximity threshold or other threshold that eliminates at least one subvolume from consideration.

36. The system of claim 27, wherein the path time is measured in real-time measures or measured in number of frames.

37. The system of claim 27, wherein the camera path is equal to the preferred coarse path and/or is derived from the preferred coarse path using occlusion maps generated after the start point, end point and camera point are known.

38. The system of claim 27, wherein:
  the one or more computer-readable tangible media are further configured to store predicted possible new locations for the camera focus point; and
  the processor is further configured to alter the camera path to account for the possible new locations to increase a probability that the camera focus point will remain visible from the camera path as the camera focus point moves.

39. The system of claim 27, wherein the processor is further configured to:
  determine a current camera view position on a current camera path;
  update the stored location for the start point to match the current camera view position or an estimation of a current camera view position following a current iteration of determining a current camera view position; and
recalculate the camera path using the updated start point.

* * * * *